H. N. EDENS.
CLUTCH
APPLICATION FILED JULY 6, 1918.

1,316,432.

Patented Sept. 16, 1919.
2 SHEETS—SHEET 1.

WITNESS:
T. F. Britt

INVENTOR
Henry N. Edens
BY Geo. W. Young
ATTORNEY

H. N. EDENS.
CLUTCH
APPLICATION FILED JULY 6, 1918.

1,316,432.

Patented Sept. 16, 1919.
2 SHEETS—SHEET 2.

WITNESS:
J. F. Britt

INVENTOR
Henry N. Edens
BY Geo. W. Young
ATTORNEY

UNITED STATES PATENT OFFICE.

HENRY N. EDENS, OF NEW HOLSTEIN, WISCONSIN, ASSIGNOR TO JOHN LAUSON MANUFACTURING COMPANY, OF NEW HOLSTEIN, WISCONSIN.

CLUTCH.

1,316,432.   Specification of Letters Patent.   Patented Sept. 16, 1919.

Application filed July 6, 1918. Serial No. 243,509.

*To all whom it may concern:*

Be it known that I, HENRY N. EDENS, a citizen of the United States, and resident of New Holstein, in the county of Calumet and State of Wisconsin, have invented certain new and useful Improvements in Clutches; and I do hereby declare that the following is a full, clear, and exact description thereof.

This invention relates to improvements in clutches and more particularly to that class of clutches employing a rotary member secured to one shaft and expansible clutching members carried by the abutting shaft.

The primary object of the present invention resides broadly in the provision of means for equalizing the pressure exerted upon the different clutching members.

A more specific object is to provide a clutch of the class described with means adapted to prevent one gripping member from exerting pressure against the other, upon the releasing operation of the clutch.

With these and other objects in view, which will be apparent as the description proceeds, my invention resides in the novel features of construction, combination and arrangement of parts as hereinafter described and defined by the appended claims, it being understood that changes in the precise embodiment might be made by those skilled in the art, without departing from the spirit of the invention.

This invention in one practical form in which it may be embodied is illustrated in the accompanying drawing in which:—

Figure 1:
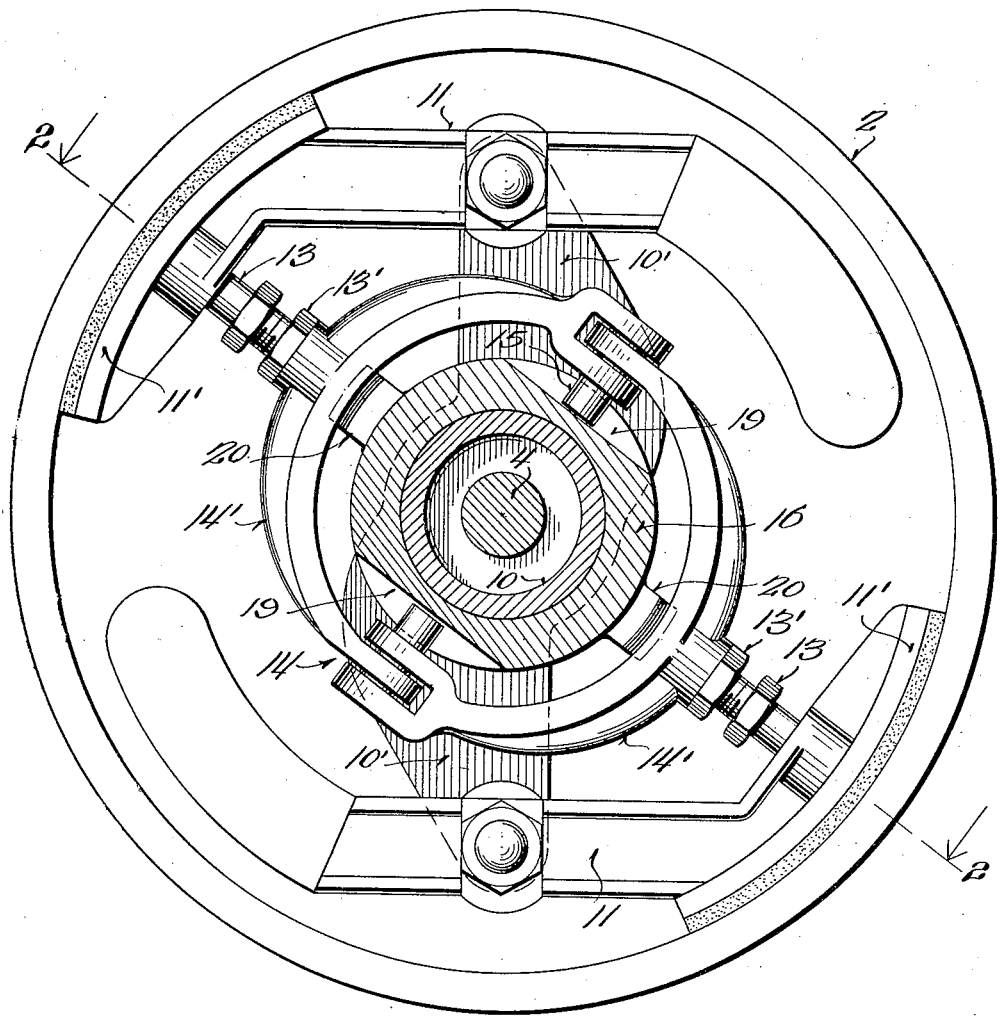
Figure 1 is a face view of the clutch, partly in section as indicated by the line 1—1 of Fig. 2.

Referring now more particularly to the accompanying drawings, 1 designates a driving shaft provided with a flange to which is secured a fly wheel 2 having an inner peripheral friction surface. The fly wheel 2 is provided with a hub in which is mounted an anti-frictional bearing 3. Journaled in the bearing 3 is a stud shaft 4 having secured to its outer end a coupling head 5 forming part of a flexible connection 6, between the driven shaft 7 and the stud shaft 4, which is in axial alinement with the driving shaft 1. Adjacent the coupling head 5 is a similar head 5' secured to the end of the shaft 7. The head members 5 and 5' are provided with toothed projections 8 which are locked together against relative circumferential movement by a circular link chain 9.

While I have shown and described the flexible connection, it will be understood that the same forms no part of the invention, nor is it necessary to the operation of the clutch.

Mounted upon the stud shaft and secured to the coupling head 5 is a hub 10 provided with ears 10' to which are pivotally connected weighted clutch members 11 having arcuate gripping ends 11' provided with a facing of fiber or other suitable material to obtain a friction surface. It will be seen that when the hub carrying the clutch members 11 is rotated, the tendency of the weighted ends of the same will tend to urge the arcuate gripping ends 11' out of engagement with the fly wheel. Centrally of the arcuate gripping ends 11' are provided recesses 12 to receive the rounded ends of the threaded studs 13 carried by the yoke 14. Intermediate their ends, the studs 13 are provided with flattened wrench surfaces to enable them to be adjusted with relation to the yoke. Threaded upon the studs are nuts 13' to lock them in their adjusted position. The yoke 14 comprises collapsible sections 14' hingedly connected at their abutting ends by the pivot 15.

In the present device, the floating yoke 14 has a floating movement transversely of the shaft and takes up the entire strain or tension between the clutching members. In view of this, it will be seen that an unequal adjustment upon one of the studs 13 will be compensated for through the yoke, thus causing an equal tension upon the opposite clutching members.

Slidably mounted upon the hub 10 is a sleeve 16 provided at one end with a groove 16' adapted to receive projections carried by a spanner lever 17 which has connected thereto an operating rod 18 for the purpose of shifting the sleeve 16 upon the hub 10. The sleeve 16 is further provided with milled-out grooves 19 into which the pivots 15 extend.

Figure 2:
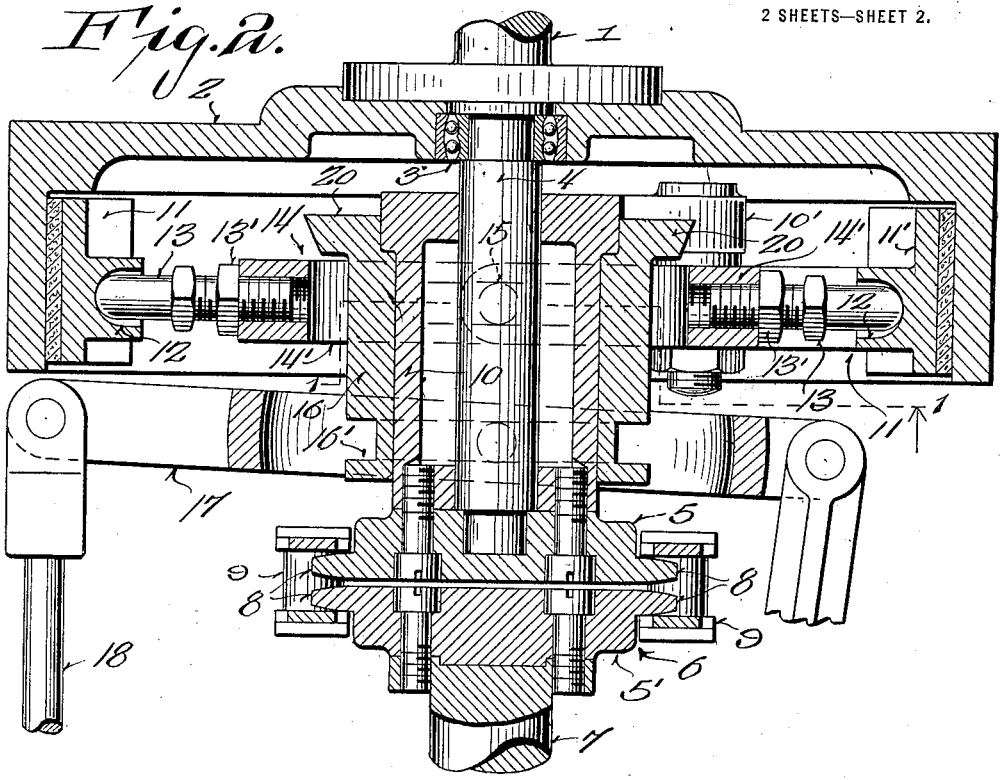
Fig. 2 is a transverse section through the clutch, taken upon the line 2—2 of Fig. 1.
Figure 3:
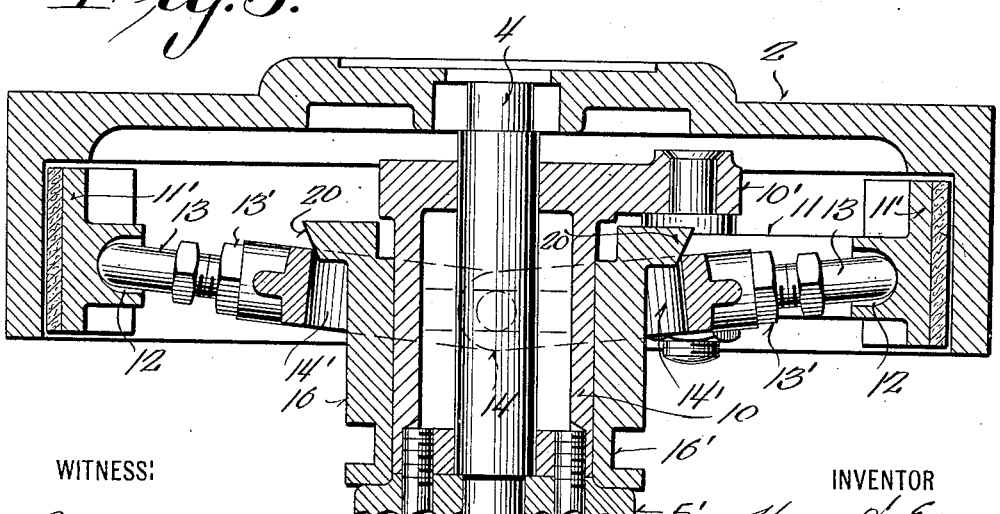
Fig. 3 is a view similar to Fig. 2, showing the different parts of the clutch in their released position.

As clearly indicated in the drawings, when the sleeve 16 is shifted to the position shown in Fig. 2, the collapsible yoke 14 will be straightened out, thereby causing the studs 13 to exert a pressure upon the ends 11' to effect a clutch between the members 11 which are indirectly connected to the shaft 7 and the fly wheel 2 carried upon the driving shaft 1. Upon movement in the opposite direction of the sleeve 16, as shown in Fig. 3, the hinged ends of the sections 14 are shifted with the sleeve, causing the yoke to slightly collapse, thereby retracting the studs which relieves the pressure exerted upon the clutching members and allows relative movement between the shafts 1 and 7.

In some instances, due to slight variations in the weighted arms of the clutch members 11, the centrifugal force, which releases the clutching heads 11 from engagement with the fly wheel, will be unequal, thereby causing one of the heads 11' to act upon the other through the yoke 14, causing it to hold the same in clutch relation with the fly wheel. This is overcome by the nibs 20 provided at one end of the sleeve 16. Upon shifting the sleeve 16 to that position shown in Fig. 3, the yoke sections 14' will be slightly collapsed until one of them engages the adjacent nib, whereupon that section will act as a lever, using the nib as a fulcrum to retract the opposite sections from the clutching member, thereby allowing it to release.

I claim:

1. In a clutch, a fly wheel, clutch members adapted to engage the fly wheel, a floating hinge member adapted to expand and release the clutch members, means for shifting the hinge member, and means engaging the hinge member whereby equal release of the clutch members is obtained.

2. In a clutch, a fly wheel, a hub provided with ears, clutching members pivoted upon said ears and adapted to be centrifugally urged out of engagement with the fly wheel, a yoke adapted to expand the clutching members, means for longitudinally shifting the yoke, and means engaging the yoke sections upon collapse of the same whereby pressure upon both clutch members is released.

3. In a clutch, a fly wheel, a hub provided with ears, clutch members pivotally mounted upon said ears, a sleeve slidably mounted upon the hub, a hinged yoke in slidable engagement with said sleeve, nibs carried by the sleeve adapted to engage the sections of said yoke upon their collapse, adjustable stubs carried by the yoke and adapted to engage the clutch members, and means for slidably shifting the sleeve.

In testimony that I claim the foregoing I have hereunto set my hand at New Holstein, in the county of Calumet and State of Wisconsin.

H. N. EDENS.

Copies of this patent may be obtained for five cents each, by addressing the "Commissioner of Patents, Washington, D. C."